(12) United States Patent
Steuer et al.

(10) Patent No.: US 6,478,710 B1
(45) Date of Patent: Nov. 12, 2002

(54) SHIFTING DEVICE FOR A MULTI-SPEED HUB FOR A BICYCLE

(75) Inventors: Werner Steuer; Michael Kohaupt, both of Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 9 days.

(21) Appl. No.: 09/594,101

(22) Filed: Jun. 14, 2000

(30) Foreign Application Priority Data

Jun. 17, 1999 (DE) .......................... 199 27 699
Mar. 22, 2000 (DE) .......................... 100 14 265

(51) Int. Cl.[7] .............................. F16H 3/44
(52) U.S. Cl. .................. 475/289; 475/297; 475/299
(58) Field of Search ................. 475/297, 298, 475/299, 289, 312

(56) References Cited

U.S. PATENT DOCUMENTS

| 4,628,769 A | | 12/1986 | Nagano ..................... 74/750 |
|---|---|---|---|
| 5,562,563 A | * | 10/1996 | Shoge ........................ 475/298 |
| 5,896,969 A | * | 4/1999 | Meier-Burkamp ........... 192/64 |
| 5,967,937 A | * | 10/1999 | Matsuo ....................... 475/297 |
| 6,010,425 A | * | 1/2000 | Tabe .......................... 475/259 |
| 6,123,179 A | * | 9/2000 | Chen .......................... 192/64 |

FOREIGN PATENT DOCUMENTS

EP            0531608           3/1993

* cited by examiner

*Primary Examiner*—Sherry Estremsky
(74) *Attorney, Agent, or Firm*—Cohen, Pontani, Lieberman & Pavane

(57) ABSTRACT

A shifting device for a multi-speed hub for a bicycle that, comprises a hub axle, a driver, a hub sleeve and an epicyclical transmission with an annulus, a plant carrier, planet wheels and a sun wheel, a control device for changing the gear ratios between the multi-speed hub and a remote control. The gear change is executed exclusively by the lifting out or engagement of pawls which can be controlled by means of a shift unit. The shift sleeve and bushing have projections and gaps and can slide under a respective foot of the pawl thereby enabling the pawls to be forcibly disengaged. An advantage of the invention is the ability to disengage the respective pawl even under load without the need to employ relatively large control forces by means of the remote control.

25 Claims, 2 Drawing Sheets

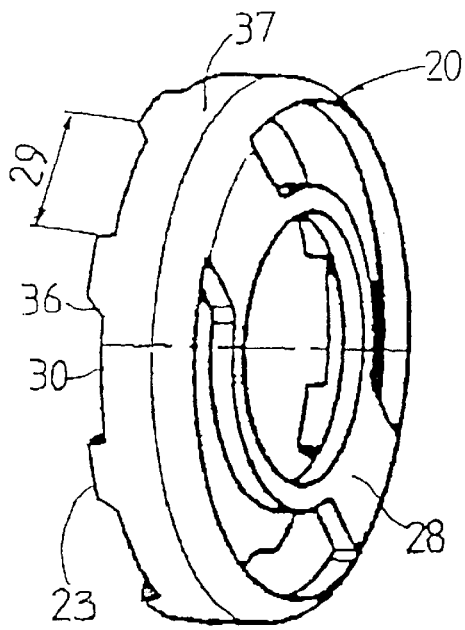
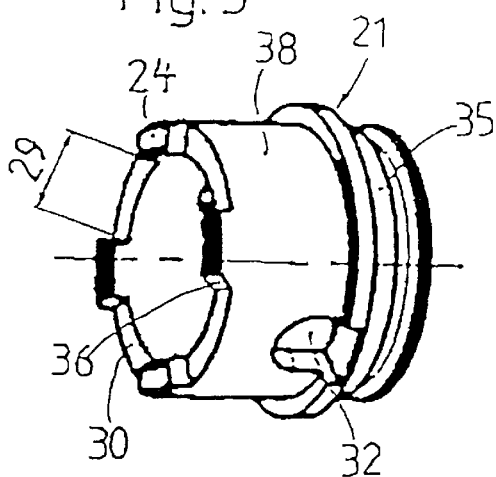
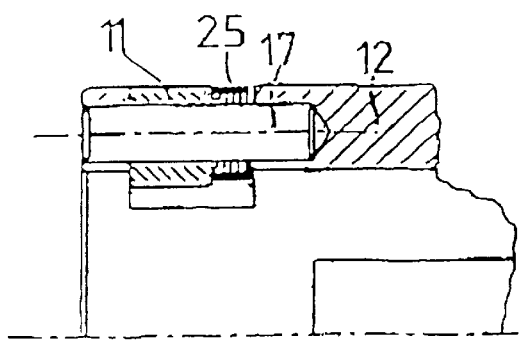
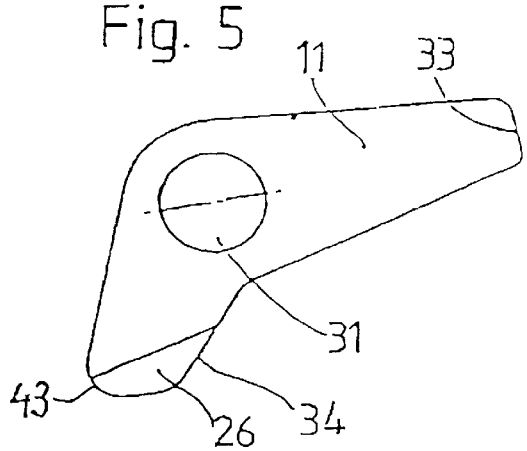
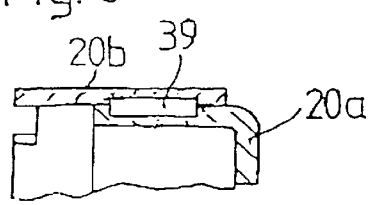
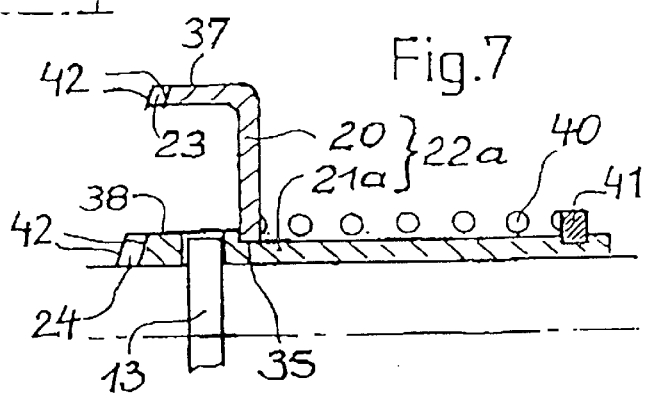

SHIFTING DEVICE FOR A MULTI-SPEED HUB FOR A BICYCLE

BACKGROUND OF THE INVENTION

The invention relates to a shifting device for a multi-speed hub.

German Patent DE 42 29 023 disclose a multi-speed hub which has a shifting device between two locking-mechanism levels in a multi-speed hub which can be shifted backward and forward even under load. The shifting is achieved by propulsion pawls which are held forcibly in driving engagement, are arranged one above the other and have an angle of tooth engagement chosen such that the propulsion pawls slide out of engagement under load. A control disk can be displaced under the propulsion pawls, thereby alternately holding the pawls fast and locking them in their associated ratchet toothing. The control disk is taken along at the driving speed by means of a driver disk in the pawl carrier and has a rearward rotational idle travel relative to the propulsion pawls which is necessary in order to use the initial angular degrees when braking by backpedaling to lift out the forcibly held propulsion pawls. Such a shift mechanism has the advantage, by virtue of the division of the power transmitted into a driving component and an inward-directed control component, of only requiring the management of the smaller control component, even under load.

SUMMARY OF THE INVENTION

The present invention is in a greatly simplified and low-cost shift unit for a multi-speed hud which can likewise disengage the pawls of the pawl-controlled hub under load and maintain them in this disengaged state.

The invention is formed with a shift sleeve, which is arranged around a hub axle, and a shift bushing connected rotatably to it, the sleeve and the bushing having on their respective end faces shift projections which are separated by gaps of sufficient width to slide under the respective pawl to be lifted out. The pawl is enclosed on both sides by projections. Since the shift sleeve and the shift bushing each have a different and, in particular, slower rotational speed than the pawls, a projection which has slid in front of the pawl will slide under the latter due to the propulsive power of the driving torque from the rider and will lift out the pawl. The control force required for the above described shift operation is not particularly great but it must be considered that the profiles do not always approach the respective pawls in the desired manner. If a projection collides with a pawl, the latter cannot be lifted out by the projection if the applied torque is high. Only if the pawl is between two projections can the projection slide under the pawl and disengage the latter from its torque connection. However, the projection can lift the pawl out even when this pawl is not transmitting any significant torque. This advantage in terms of shifting, which is also present to allow shifting through the gear ratios when the transmission is stationary, is provided by additional bevels on the pawl. It is furthermore proposed to enhance the capability for shifting through the gears by arranging conical chamfers on the end faces of the projections and/or the gaps between the projections in addition to the bevels on the pawls, the alignment of the chamfers coinciding approximately with the bevels on the pawls. Finally, the projections of the profile on the shift bushing and on the shift sleeve have bevels which are arranged in the circumferential direction and which can act as a load-limiting means by virtue of the fact that the shift bushing or the shift sleeve is repelled by the pawls when large torques are being transmitted via the pawls. It is advantageous to connect the shift bushing and/or the shift sleeve to a rider-operated remote control by means of storage springs which allows a change in gear ratio only when a certain lift-out torque is reached and which delay the shift operation. It is possible, by means of the configuration of these storage springs, to define the desired lift-out torque, thereby avoiding excessive shifting shocks. The shift sleeve or the shift bushing will thus find another location for engagement under the pawl, which will be lifted out when the torque is reduced.

In a three-speed hub, a first pawl is mounted on the annulus and engages the toothing of the hub sleeve. Since the annulus necessarily rotates more rapidly than the planet carrier when the latter is being driven, it is necessary to couple the shift bushing to a coupling ring rotating at the rotational speed of the planet carrier. On the other hand, the shift bushing must be axially displaceable, something which can only be achieved by means of a shift component, which preferably is a thrust block connected to a remote control. The two movements described above can be imparted to the shift bushing on the one hand by virtue of the rotatable mounting of the shift bushing on the shift sleeve, which is connected in a rotationally rigid manner to the thrust block, and secondly by virtue of the mounting of the shift bushing in a slot in the coupling ring, which rotates more slowly when a fast gear has been selected than the pawl operatively connected to the hub sleeve.

If the connection between the driver and the planet carrier is likewise by way of a pawl, what has been stated above applies in as much as the pawl of the more slowly rotating planet carrier overtakes the profile of the shift sleeve, which is connected in a rotationally rigid manner to the hub axle but is axially displaceable, and provides the same lift-out conditions for the pawl as those described above in connection with the shift sleeve. To ensure operation during backpedaling, the pawls in the region of the foot, should have a contour such as a rounding or chamfer so that the pawls are lifted out and do not jam in the event that they have not yet been lifted out but are still in the region between the projections. Since there is no load on the pawls during backpedaling, the only point of importance is that the rounding should be sufficiently great.

Finally, it is advantageous not to maintain the shift bushing in an axially fixed position on the shift sleeve but to hold it by means of a storage spring since there, as described, brief hindrances to shifting have to be compensated for if it is required to be able to operate the remote control without resistance.

The object of the invention is therefore to provide a shifting device for a multi-speed hub which can perform the gear change while stationary and even under load without a significant increase in the control forces on a remote control.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows the shift bushing with shift projections and gaps as a configuration for the profile;

FIG. 3 shows the shift bushing with an aperture for a thrust block and the profile for lifting out the pawl;

FIG. 4 shows the spring-loadable pawl mounted on a pin in a coupling ring;

FIG. 5 shows the pawl with a foot and a bevel thereon;

FIG. 6 shows a two-part shift sleeve with a friction clutch for load limitation during the engagement of the profile under the pawl; and FIG. 7 shows a shift unit comprising the shift bushing shown in FIG. 2 and a modified shift sleeve in accordance with FIG. 3 with a storage spring.

DETAILED DESCRIPTION OF THE PRESENTLY PREFERRED EMBODIMENTS

Figure 1:
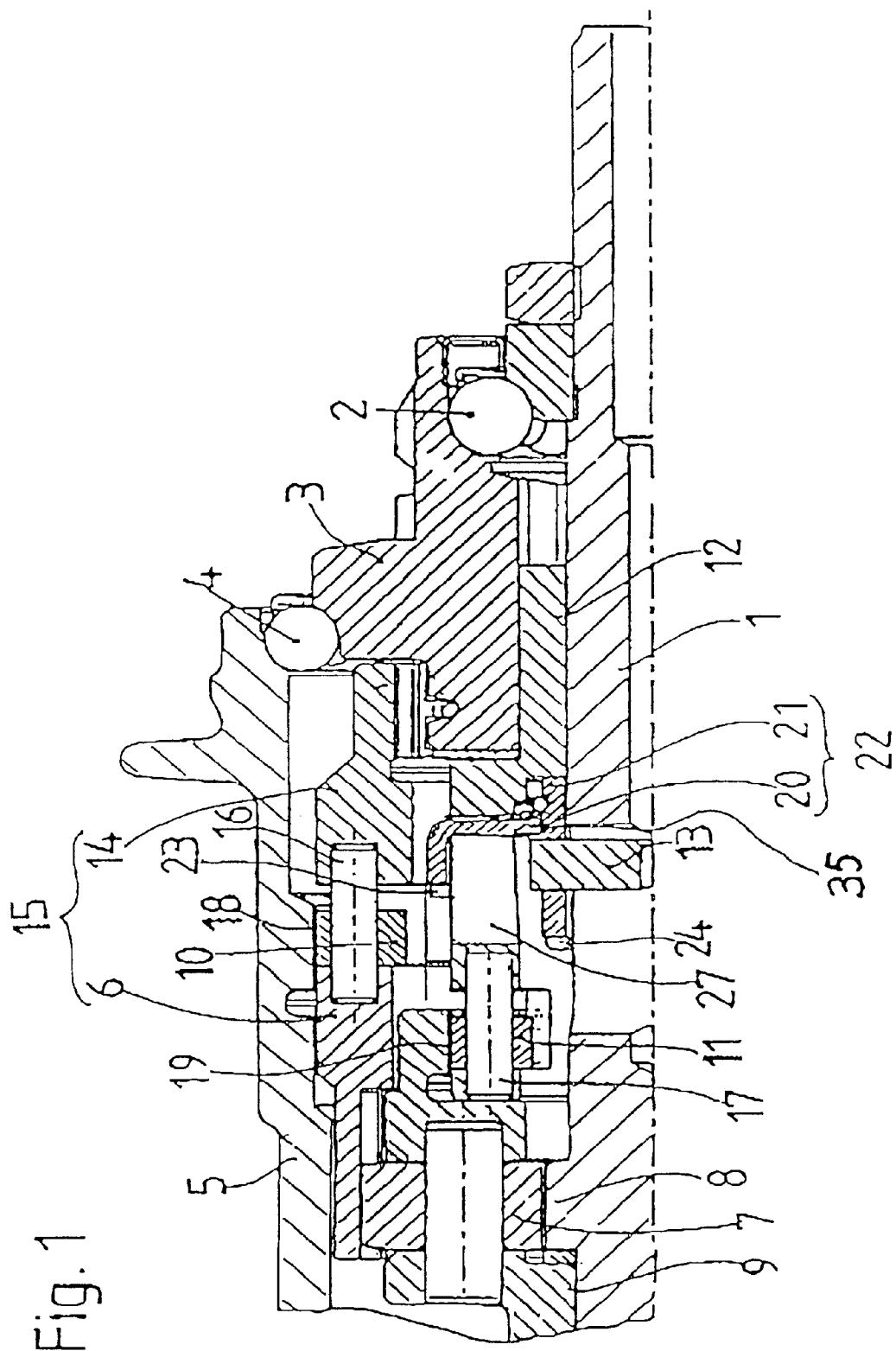
FIG. 1 shows a partial section of a multi-speed hub with a shift unit comprising a shift bushing and a shift sleeve with profiles on its end for lifting out pawls.

Referring to the drawings, FIG. 1 shows a hub axle 1 of a multi-speed hub and a driver 3 rotatably mounted on the latter by a first bearing 2. A second bearing 4 connects a hub sleeve 5 rotatably to the driver 3 and the hub axle 1. Arranged on the hub axle 1 within the hub sleeve 5 is an epicyclic transmission comprising an annulus 6, planet wheels 7, which are mounted in a planet carrier 9, and a fixed sun wheel 8. The multi-speed hub is a pawl-controlled three-speed hub, which is illustrated with the top gear selected in FIG. 1. Mounted resiliently on a first pin 16, between a drive ring 14 and the annulus 6, is a first pawl 10, which engages by means of a driving edge 33 in a first toothing 18 of the hub sleeve 5. An annulus unit 15 formed by the annulus and the drive ring is connected to the driver 3 by a pawl-type freewheel. Likewise connected in a rotationally rigid manner to the driver is a coupling ring 12 with a slot 27 and a second pin 17, on which a second pawl 11 is resiliently mounted and engages by means of its driving edge 33 in a second toothing 19 on the planet carrier 9. A shift bushing 20 is connected in a rotationally rigid but axially displaceable manner to the coupling ring 12 by a web 28 in the slot 27, thereby allowing a profile with shift projections 23 and gaps 30 to be pushed against a foot 34 of the first pawl 10.

From FIG. 2 it can be seen that the profile with the projections 23 and the gaps 30 also has chamfers 36, which connect the shift projections 23 to the gaps 30 at least on one side. The shift bushing 20 is connected in such a way that it is rotatable but axially fixed on a shift sleeve 21 and it forms a shift unit 22 with the latter. As shown in FIG. 3, the shift sleeve 21 has an aperture 32, in which there engages a thrust block 13 which is connected to a remote control and can be displaced axially in a slot in the hub axle 1 by means of a shifting device (not shown here). On its end face facing the second pawl 11, the shift sleeve 21 likewise has a profile with projections 24 and gaps 30, it being possible to push the profile against a foot 34 with the bevel 26 of the second pawl 11. The foot 34 of the pawls 10 and 11 has a contour 43 which is large enough to prevent the pawls 10 and 11 from jamming when backpedaling when the pawls 10 and 11 are just between the projections 23 and 24. The pawls 10 and 11 are repelled at the respective projection and lifted out; there is of course no torque applied.

FIGS. 4 and 5 show the position of the second pawl 11 on the pin 17 in the coupling ring 12. A spring 25 is arranged around the pin 17 and moves the second pawl 11 by means of its driving edge 33 against the toothing 19 in the planet carrier 9. The pawls 10 and 11 have a hole 31 by means of which they are pivotably mounted on their pins 16 and 17.

FIG. 6 shows a two-part shift bushing with an interposed overload clutch as a possible variant, the two-part shift bushing comprising a ring 20b and a bushing 20a which are connected to one another by a friction clutch 39. The friction clutch 39 can prevent or delay the shift operation under peak load and shift it to a lower-torque range. Lower torques occur whenever the lowest torque range with the pedal cranks vertical is reached as the bicycle is being pedaled.

Referring to FIG. 7, an explanation is given of a shift unit 22a which, in contrast to the shift unit 22 described above, comprises the shift bushing 20 and a shift sleeve 21a, which are connected rotatably to one another and additionally in a manner which allows axial displacement. The axial positioning of the shift bushing 20 on the shift sleeve 21a is ensured by a storage spring 40 which is arranged between the shift bushing 20 and a retaining ring 41 and pushes the shift bushing 20 against a stop on the shift sleeve 21a. When the shift bushing 20 is displaced against the first pawl 10, the shift bushing 20 is displaced on the shift sleeve 21a, with a simultaneous stressing of the storage spring 40, until those things which are inhibiting shifting are eliminated and the shift projections 23 surround the first pawl 10. Finally, the profiles can have chamfers 42 on the respective end faces of the shift projections 23, 24 and/or the gap 30, these chamfers coinciding in their direction with the bevels 26 on the pawls 11 and, by virtue of their circular course, being of conical design.

To explain the operation of the three-speed hub, the power-flow paths will be described:

In the position of the shift unit 22 illustrated in FIG. 1, both pawls 10 and 11 with their teeth 18 and 19 are in use and the power flow in the fast gear is as follows: driver 3, coupling ring 12, second pawl 11, planet carrier 9, planet wheel 7, annulus 6, pawl 10, toothing 18 in the hub sleeve 5.

In the normal gear, the thrust block 13 with the shift unit 22 is displaced into the center of the slot in the hub axle 1. As a result, the projections 23 of the shift bushing 20 slide under the first pawl 10 and lift it out of its associated toothing 18 on the hub sleeve 5. The shift bushing 20 comes to rest with an outer cylindrical surface 37 under the first pawl 10, thus ensuring that the latter remains permanently lifted out. In this case, the power flows from the driver 3, via the coupling ring 12, the second pawl 11, the planet carrier 9 and via a permanently engaged third pawl (not shown here) which is connected to the planet carrier 9, into the hub sleeve 5. By virtue of its transmission ratio, the annulus 6 co-rotates more rapidly but has no effect with regard to the rotation of the hub sleeve 5 because the first pawl 10 has been lifted out.

To obtain the hill-climbing gear, the shift sleeve 21, 21a is pushed with its projections 24 under the second pawl 11 by the thrust block 13, causing the pawl to run onto an outer cylindrical surface 38 of the shift sleeve 20 and likewise to remain lifted out of its associated toothing 19 in the planet carrier 9. Both pawls 10 and 11 are thus ineffective and power flows from the driver 3, via a permanently engaged fourth pawl between the driver 3 and the drive ring 14, via the first pin 16 into the annulus 6, and, via the planet wheel 7, drives the planet carrier 9 with a reduction, on which planet carrier the likewise permanently engaged above described third pawl can take effect between the planet carrier 9 and the hub sleeve 5.

The power-shift capability of the three-speed hub is based primarily on the profile on the end faces of the shift bushing 20 and the shift sleeve 21, 21a. The engineering required to lift it out of the toothing 18 under load will be described below using the first pawl 10 as an example:

The shift projections 23 are connected to one another by gaps 30 with a width 29, this width 29 being sufficient to enable one shift projection 23 to be positioned in front of the first pawl 10 and one shift projection 23 to be positioned behind the pawl as the shift bushing 20 is displaced. Since the first pawl 10 runs at a different rotational speed from the shift projections 23, they must be spaced apart by an amount sufficient to ensure the above-described shifting position of the profile with the shift projections 23. Since the first pawl 10 has a higher rotational speed than the shift projections 23, the foot 34 runs onto one of the shift projections 23 in the case of engagement and releases the engagement of the driving edge 33 with the first toothing 18. No control force is required to lift the first pawl 10 out of the first toothing 18 since the forces for lifting out are derived exclusively from the propulsion forces obtained by pedaling.

To change gear at relatively low torques, specifically when the transmission is stationary, a respective bevel 26 is arranged on each of the pawls 10 and 11. These bevels can interact with the above-described shift projections 23, 24 and the gaps 30. In this case, a certain amount of control force is required, so that in this case the pawls 10 or 11 are either lifted out or the movement is stored in a storage spring of the control device until the respective profile of the shift sleeve 21 or shift bushing 20 is in a suitable position of engagement under the pawls 10 or 11. As already explained, the bevels 36 between the shift projections 23, 24 and the gaps 30 limit the peak torque for lifting out the pawl 10, 11.

The terms and expressions which have been employed are used as terms of description and not of limitation, and there is no intention in the use of such terms and expressions of excluding any equivalents of the features shown and described or portions thereof, it being recognized that various modifications are possible within the scope of the invention

We claim:

1. A shifting device for a multi-speed hub for a bicycle, comprising
   a hub axle;
   a driver;
   a hub sleeve;
   at least one epicyclical transmission, each comprising at least one annulus, at least one planet carrier, planet wheels and at least one sun wheel for transmitting rotational power between the driver and the hub sleeve through different transmission paths;
   wherein one of the controllable feewheel clutches transmits rotational power between the annulus and the hub sleeve;
   a control device to select between different transmission paths for change gear ratios in the transmission with at least two controllable freewheel clutches, the control device being actuated by a remote control;
   wherein the control device has a shift unit comprising a shift sleeve and a shift bushing, each of which has, on the sides facing the controllable freewheel clutches, profiles which can disengage the controllable freewheel clutches under load by a relative rotation between the controllable freewheel clutch and at least one of the shift sleeve and shift bushing when the gear ratios are changed, the relative rotation between the controllable freewheel clutch and shift sleeve and between the controllable freewheel clutch and shift bushing caused by elements which are components of the transmission path.

2. The shifting device of claim 1, wherein the freewheel clutches are pawls.

3. The shifting device of claim 2, wherein the shift unit has a cylindrical surface which slides under a control region of the pawl during the shift operation, and after the cylindrical surface lifts out the pawl; the cylindrical surface holds the pawl out of engagement.

4. The shifting device of claim 2, wherein each of the pawls is the same.

5. The shifting device of claim 2, wherein each of the pawls has a driving edge, and said driving edge interacts with toothings, the driving edge being pressed against the toothings by the prestressing force of a spring.

6. The shifting device of claim 2, wherein, during riding, a first pawl rotates more quickly in the transmission before the changing of the gear ratios than the shift bushing, and wherein a second pawl likewise rotates more quickly than the shift sleeve.

7. The shifting device of claim 2, wherein the profiles are shift projections and gaps on the end faces of at least one of the shift bushing and the shift sleeve.

8. The shifting device of claim 7, wherein the end faces of at least one of the projections and gaps each have a conical chamfer which interacts with bevels of the pawls when the epicyclical transmission is stationary.

9. The shifting of claim 8, wherein each of the gaps between the shift projections has a sufficient width to allow the shift bushing and/or the shift sleeve to be pushed against the pawl during riding until the end face situated in the gap can interact with at least one of the pawls.

10. The shifting device of claim 9, wherein the shift projections on the edges which interact with the bevels of the pawls have chamfers.

11. The shifting device of claim 2, wherein the pawls are pivotably mounted about respective bearing locations and each has a control region which interacts with the profiles of the shift unit for the purpose of lifting out the pawls.

12. The shifting device of claim 11, wherein, on the side facing the shift unit, the control region has a bevel which interacts with the profiles of the shift unit.

13. The shifting device of claim 1, wherein the shift sleeve is connected to the shift bushing, the shift sleeve and shift bushing are rotatable and axially fixed relative to each other.

14. The shifting device of claim 1, wherein the shift sleeve is connected to the shift bushing, the shift sleeve and shift bushing arc rotatable and the shift bushing is axially displaceable relative to the shift sleeve.

15. The shifting device of claim 14, wherein the shift bushing is held on the shift sleeve by a storage spring.

16. The shifting device of claim 15, wherein at least one of the shift bushing and the shift sleeve is repelled by the pawls when a certain lift-out torque against the storage springs is exceeded.

17. The shifting device of claim 14, wherein the shift bushing lags temporarily behind the shifted shift sleeve by the travel corresponding to at least one gear ratio.

18. The shifting device of claim 1, wherein the shift unit can be axially displaced by a remote control to change gear ratios.

19. The shifting device of claim 1, wherein the shift sleeve is operatively connected to the hub axle and is longitudinally displaceable and rotationally rigid with respect to the hub axle.

20. The shifting device of claim 19, wherein the shift sleeve is operatively connected to the remote control by a thrust block.

21. The shifting device of claim 1, wherein the shift sleeve is operatively connected to the remote control by a sliding element.

22. The shifting device of claim 21, wherein the sliding element is guided in or on the hub axle.

23. The shifting device of claim 1, wherein the shift unit has a friction clutch to limit the lift-out torque under load.

24. The shifting device of claim 1, wherein the shift bushing is mounted in a rotationally rigid but axially displaceable manner in a coupling ring, which is connected in a rotationally rigid manner to the driver.

25. The shifting device of claim 24, wherein the shift bushing rotates at the rotational speed of the driver, driving being effected by means of a web guided in a slot in the coupling ring, the shift bushing projecting through the coupling ring.

* * * * *

UNITED STATES PATENT AND TRADEMARK OFFICE
CERTIFICATE OF CORRECTION

| | |
|---|---|
| PATENT NO. | : 6,478,710 B1 |
| DATED | : November 12, 2002 |
| INVENTOR(S) | : Werner Steuer and Michael Kohaupt |

It is certified that error appears in the above-identified patent and that said Letters Patent is hereby corrected as shown below:

<u>Column 5,</u>
Line 47, delete "feewheel" and insert -- freewheel --.
Relocate lines 47-49 to be located after line 53.

Signed and Sealed this

Fifteenth Day of February, 2005

JON W. DUDAS
*Director of the United States Patent and Trademark Office*